United States Patent [19]
Inose et al.

[11] 3,905,015
[45] Sept. 9, 1975

[54] VEHICLE COLLISION DETECTING APPARATUS

[75] Inventors: Fumiyiki Inose, Kokubunji; Takashiro Iwasaki, Kodaira, both of Japan

[73] Assignee: Hitachi, Ltd., Japan

[22] Filed: Mar. 17, 1972

[21] Appl. No.: 235,752

[30] Foreign Application Priority Data
Mar. 17, 1971 Japan................................ 46-14406

[52] U.S. Cl. ............. 340/61; 340/52 H; 200/61.08; 180/91
[51] Int. Cl................................................ B60q 1/44
[58] Field of Search ......... 340/52 H, 61; 200/61.08, 200/61.45 R; 180/91, 103, 104

[56] References Cited
UNITED STATES PATENTS
2,145,543  1/1939  Gross................................ 200/61.08
3,441,925  4/1969  White............................ 200/61.08 X

*Primary Examiner*—Alvin H. Waring
*Attorney, Agent, or Firm*—Craig & Antonelli

[57] ABSTRACT

A vehicle collision detecting apparatus employs a detecting element constituted in a fragile material such as glass, with a coating of a conductive film for providing the detecting element with conductivity, or the fragile material contains a conductive material such as metal for providing the detecting element with conductivity. A circuit for continuously monitoring the conduction state of the detecting element is also provided wherein the detecting element is fixed in the periphery of the vehicle body, the conduction state of the detecting element is monitored, and an air-bag occupant protection device is actuated at the moment the detecting element breaks, due to vehicle collision and its conductivity vanishes.

6 Claims, 6 Drawing Figures

VEHICLE COLLISION DETECTING APPARATUS

BACKGROUND OF THE INVENTION

This invention relates to a collision detecting apparatus provided with an air-bag system for protecting the vehicle driver and passenger in the event of a collision. The invention relates more particularly to a collision detecting apparatus in which the conduction state of the collision detecting element loses its conductivity.

DESCRIPTION OF THE PRIOR ART

In the prior art, a pair of mutually opposite electrodes are fixed in the periphery of a body, such as vehicle, for collision detection. When the body receives a strong external impact, the periphery of the body is partly deformed and, concurrently, the electrodes are deformed and short-circuited. Hence, by monitoring the conduction state of the electrodes at all times, collision can be detected.

This type of detecting element, however, gives rise to several problems. For example, (a) the electrodes are not deformed unless the part where the electrodes are fixed is hit and deformed, (b) the electrodes are not always short-circuited by deformation due to collision impact, and (c) depending on the state of collision, there is the possibility of breaking the lead wire to the electrodes simultaneously when the electrodes are short-circuited. For these reasons, the operating reliability is low and the application field is limited in the conventional apparatus.

SUMMARY OF THE INVENTION

An object of this invention is to provide a collision detecting apparatus capable of securely responding to deformation or strain caused in the vehicle body due to collision.

Another object of the invention is to provide a collision detecting apparatus operable with a minimum amount of misoperation due to vibration, thus maintaining greater safety.

Still another object of the invention is to provide a structurally simple, inexpensive collision detecting apparatus.

With the above and other objects in mind, the present invention provides a collision detecting apparatus in which a fragile and conductive collision detecting element is used, which element is constituted of a fragile material such as glass with a coating of a conductive film formed by metal evaporating deposition, sputtering, plating, or the like, thereby establishing conductivity in the collision detecting element. Instead of the conductive coating, a metal may be added to the fragile material for the purpose of providing the detecting element with conductivity, and the collision detecting element then breaks in response to deformation or strain caused in the body to which the detecting element is attached, and the circuit comprising the detecting element then loses its conductivity. According to one aspect of the invention the conduction state of the detecting element is always monitored and, at the moment conduction vanishes, ignition energy is supplied to the squib of the air-bag occupant protection system, thereby actuating the air-bag. According to another aspect of the invention, a complex collision detecting apparatus is realized by combining two collision detecting apparatus using different collision detecting methods, thus preventing misoperation of the air-bag and increasing safety.

DESCRIPTION OF THE PREFERRED EMBODIMENTS

Figure 1:
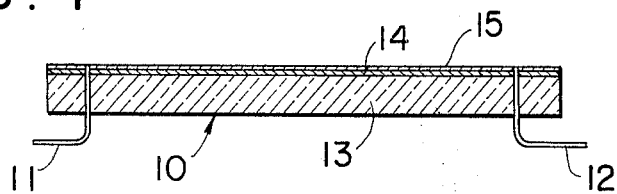
FIG. 1 is a schematic diagram showing the construction of a collision detecting apparatus of this invention.

Referring to FIG. 1, there is shown a detecting element used for the apparatus embodying this invention wherein reference numeral 10 denotes a collision detecting element, 11 and 12 lead wires, 13 a substrate being a thin slice of thick glass plate, 14 a metal film, for example, of nichrome, deposited on the glass substrate by evaporation, and 15 a metal film such as a gold film formed on metal film 14 by evaporating deposition. The purpose of the metal film 14 of nichrome is to increase the bonding strength of the deposition film 15. This detecting element is attached to the part of the vehicle body where deformation is likely to occur, for example, the inside of the bumper, hood (bonnet), fender, or the like. The detecting element is connected through the lead wires 11 and 12 to the circuit for detecting disconnection in the conductive part, i.e., the gold film 15.

Figure 2:
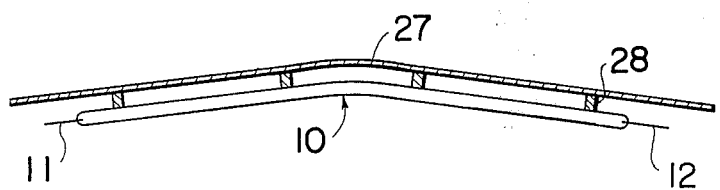
FIG. 2 is a schematic diagram showing the installation of the collision detecting elements according to this invention.

The manner in which the detecting element is installed is shown in FIG. 2, wherein the reference numeral 27 represents, in cross-section, the front hood of a car, and 10 the collision detecting element bent conforming to the shape of the hood. Instead of one detecting element, a plurality may be installed. Reference numeral 28 denotes a support member for securing the detecting element 10 to the hood 27.

In FIG. 1 again, it is desirable that the thickness of each of the metal films 14 and 15 is about one micron so that these films may break easily when the glass substrate 13 breaks. The glass substrate 13 breaks immediately when the car body is subjected to a strong external impact and part of the car body is deformed. At the moment the glass substrate 13 breaks, the metal film 15 comprising gold breaks, and the conduction between the lead wires 11 and 12 vanishes. Disconnection between the lead wires 11 and 12 is detected by the detecting circuit, whereby ignition energy is supplied to the squib to operate the air-bag.

Figure 3:
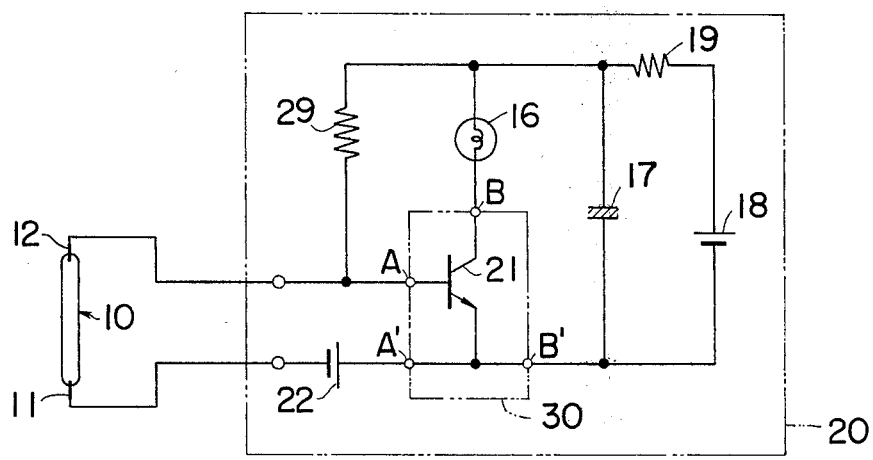
FIG. 3 is a circuit diagram of a collision detecting apparatus of this invention.

FIG. 3 shows a detecting circuit for supplying energy to the squib according to the conduction state of the collision detecting element 10. In FIG. 3, the numeral 16 denotes a squib for actuating the operation valve, located between the high pressure cylinder (not shown by diagram) and the air-bag (not shown by diagram) 17 a capacitor in which the ignition energy to the squib 16 is stored, 18 power source for supplying energy to the capacitor 17 through a resistor 19, and 29 and 22 a resistor and a power source, respectively, for biasing a transistor 21. The numeral 21 represents a transistor operated as a switch 30 to enable the capacitor 17 to supply ignition energy to the squib 16. This transistor switch is operated in such a manner that the conduction state between its output terminals B and B' is changed with change in the conduction state between its input terminals A and A'.

When the collision detecting element 10 is in the normal state, the circuit between the lead wires 11 and 12 is conducting, and a negative potential is applied to the base electrode of the transistor 21 from the power source 22 through the element 10. In this state, the transistor 21 remains in the off state, and the ignition energy stored in the capacitor 17 is not supplied to the squib 16. If the detecting element 10 breaks due to deformation caused in the car body due to collision, conduction between the lead wires 11 and 12 vanishes. As a result the base electrode of the transistor 21 is positively biased through the resistor 29, and the transistor 21 becomes conducting between the collector and emitter, i.e., between the output terminals B and B' of the collision detecting switch 30. Consequently, ignition energy is supplied to the squib 16, to actuate the air-bag. The number of the detecting element 10 is not limited to one; for example, a plurality of detecting elements 10 may be installed in series or parallel in the periphery of the car body and thus the collision detecting reliability can be increased.

Figure 4:
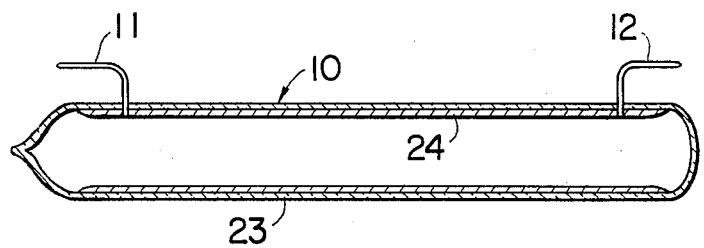
FIGS. 4 and 5 are schematic diagrams showing constructional features of other collision detecting apparatus of this invention.

FIG. 4 schematically illustrates another example of the collision detecting element 10. The numeral 23 denotes a glass tube, and 24 an aluminum film deposited on the inner wall of the glass tube 23 by evaporation. Conduction is established between the lead wires 11 and 12 by way of aluminum film 24. The glass tube 23 is evacuated for the purpose of protecting the aluminum film 24 from moisture, etc. and for facilitating breakage of the glass tube when the car body is deformed.

Figure 5:
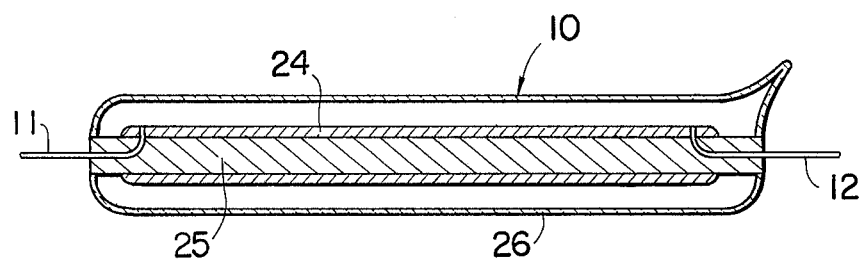

Referring to FIG. 5, there is shown another arrangement of the collision detecting element 10 wherein the numeral 25 denotes a cylinder, 24 an aluminum film deposited on the surface of the cylinder 25 by evaporation, and 26 a glass tube surrounding the circular cylinder 25 for the purpose of protecting the cylinder 25 coated with an aluminum film. The glass tube 26 is welded at its both ends to the glass cylinder 25. The glass tube 26 is evacuated for protecting the aluminum film from moisture, etc. and for facilitating breakage of the glass tube. Thus, according to the invention, the collision detecting element 10 can be realized by external evaporation deposition.

Figure 6:
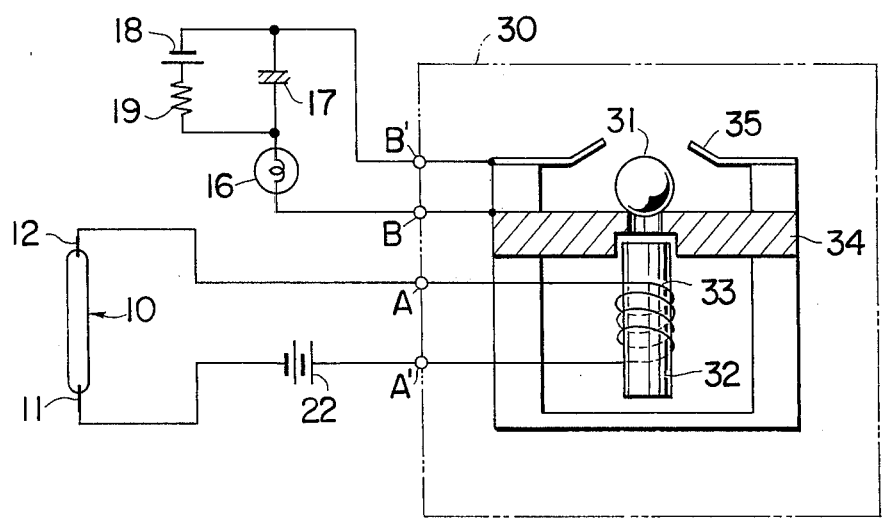
FIG. 6 is a schematic diagram showing constructional features of a complex collision detecting apparatus of this invention.

FIG. 6 schematically shows a complex collision detecting apparatus in which the foregoing breaking type collision detecting element 10 is used as the front sensor defined in co-pending application Ser. No. 235,752 filed Mar. 17, 1972, which has been assigned to the assignee of the present invention. In FIG. 6, the numeral 30 denotes a collision detecting switch consisting of a steel ball 31, a permanent magnet 32 for attracting the steel ball, a coil 33 for producing a magnetic field superposed on the magnetic field of the permanent magnet 32, and electrodes 34 and 35 to be connected by the steel ball 31. The coil 33 is wound on the permanent magnet 32. The magnetic field formed by the permanent magnet 32 can be intensified by supplying current to the coil 33. The steel ball 24 is normally held in the center, as shown in FIG. 6, by the magnetic field produced by the permanent magnet 32 and coil 33. When the impact strength exerted in the event of collision is larger than a certain specific value determined by the strength of the magnetic field produced by the permanent magnet 32 and coil 33, the steel ball 31 sways to contact the electrodes 34 and 35. A squib 16 for actuating the air-bag, and a capacitor 17 being the energy source for supplying ignition energy to the squib are connected between the electrodes 34 and 35. When the circuit between the electrodes 34 and 35 is closed, or the circuit between the output terminals B and B' of the switch 30 is closed, the ignition energy stored across the capacitor 17 is supplied to the squib 16, to actuate the air-bag. In the complex collision detecting apparatus shown in FIG. 6, one end of the coil 33 is connected to the lead wire 12 of the breaking type collision detecting element 10, and the other end to the lead wire 11 of the element 10 via the power source 22. When the detecting element 10 is in its normal state, the current from the power source 22 flows through the coil 33, and the magnetic fields by the permanent magnet 32 and by the coil 33 are applied to the stell ball 31. In this state the steel ball 31 is held fairly securely in the center of the permanent magnet and, hence, the steel ball does not move in response to usual shock or vibration caused in the car body under rough road conditions. When the collision detecting element 10 breaks due to a strong impact of collision, conduction between the lead wires 11 and 12 vanishes, and current to the coil 33 stops. As a consequence, the magnetic field by the coil 33 vanishes, and the steel ball 31 is held by only the attraction force of the magnetic field by the permanent magnet 32. In this state the steel ball 31 is readily moved by a small impact force. Should the collision detecting element 10 not be damaged in the event of collision, the steel ball moves in response to an appreciably strong impact so that the collision detecting apparatus can maintain a fail-safe operation.

The breaking type collision detecting element 10 is fixed in the periphery of the vehicle body, and the collision detecting switch 30 is installed in the central area of the vehicle body, such as in the vicinity of the driver's seat. In the event of collision, the periphery of the body is first damaged. Namely, the collision detecting element 10 is first damaged and the magnetic field by the coil is lost. Therefore, the collision detecting apparatus in the event of collision is operated accurately in the foregoing operation order and thus misoperation is minimized.

As has been described above, the invention makes it readily possible to realize a structurally simple, operably secure collision detecting apparatus. The glass substrate may be made of ordinary glass. Instead, a special glass such as reinforced glass which breaks in particular manner may be used. The use of such glass will contribute to improvements on the operating characteristics of the apparatus. Instead of a glass substrate, any suitable fragile substrate such as a ceramic substrate may be used. It is to be noted that as described in this specification, reliability is increased in a collision detecting element which breaks by collision than in the element which closes in the event of collision.

While a few embodiments of the invention have been illustrated and described in detail, it is particularly understood that the invention is not limited thereto or thereby.

We claim:

1. A vehicle collision detecting apparatus comprising:
   a. a collision detecting element means fixedly mounted on the vehicle at a position at which deformation or strain of the vehicle body is likely to occur due to vehicle collision which comprises:
      1. a substrate means constituted of fragile material for breaking in response to vehicle body deformation or strain as a result of collision;
      2. two lead terminals fixed to said substrate means at mutually distant positions; and
      3. means for providing an electrical conductive path between said terminals, said electrical conductive path means being a conductive material fixedly disposed with respect to said substrate means and being rendered non-conductive upon breaking of said substrate means; and
   b. switching means for producing an on-off signal corresponding to conduction and non-conduction of the conductive path between said lead terminals, said switching means including a magnet, a magnet member normally held in a stationary position by the attractive force of said magnet and made movable to a moving position according to the magnitude of impact of collision, a contact, to be closed when said magnetic member is moved to its moving position, a coil for producing a magnetic field superposed on the magnetic field of said magnet exerting said attractive force, and means for supplying current to said coil through said detecting element means.

2. A vehicle collision detecting apparatus comprising:
   a. a collision detecting element means fixedly mounted on the vehicle at a position at which deformation or strain of the vehicle body is likely to occur due to vehicle collision which comprises:
      1. a substrate means constituted of fragile material for breaking in response to vehicle body deformation or strain as a result of collision;
      2. two lead terminals fixed to said substrate means at mutually distant positions; and
      3. means for providing an electrical conductive path between said terminals, said electrical conductive path means being a conductive material fixedly disposed with respect to said substrate means and being rendered non-conductive upon breaking of said substrate means, said collision detecting element means further including a fragile rod-shaped substrate as said substrate means, said conductive material being a conductive film fixedly disposed on the surface of said substrate, an evacuated tube surrounding said substrate, and a pair of lead terminals installed in mutually distant positions on said conductive film and arranged to be led outside the tube; and
   b. switching means for producing an on-off signal corresponding to conduction and non-conduction of the conductive path between said lead terminals.

3. A vehicle collision apparatus comprising:
   a collision detecting element mechanically attached to a part of a vehicle body where deformation is likely to occur, said element comprising,
   1. an evacuated tubular member of a fragile material with a conductive film fixedly disposed with respect to the interior surface thereof, and
   2. first and second lead terminals installed in contact with said conductive film at both opposite ends of said tubular member, so that a normally conductive path is established between said first and second lead terminals;
   switching means for providing an indication signal representative of the collision of said vehicle in response to breakdown of the normally conductive path between said first and second lead terminals due to deformation of the vehicle body by a strong external impact, said switching means comprising:
   a. a magnet for generating a main magnetic field;
   b. a coil for operatively producing an auxiliary magnetic field which is increasingly superposed on the main magnetic field of said magnet, so that an attractive force is obtained from the superposition of said main and auxiliary magnetic fields,
   c. means for supplying current to said coil through said collision detecting element so as to actuate said coil,
   d. a magnetic member normally held in a stationary position by said attractive force and made movable to a moving position according to magnitude of impact of vehicle collision, and
   e. means for detecting said magnetic member held in its moving position, the movement of said magnetic member from its stationary position to its moving position being accelerated by breakdown of said collision detecting element due to deformation of the vehicle body.

4. A vehicle collision detecting apparatus comprising:
   a. a collision detecting element means fixedly mounted on the vehicle at a position at which deformation or strain of the vehicle body is likely to occur due to vehicle collision which comprises:
      1. a substrate means constituted of fragile material for breaking in response to vehicle body deformation or strain as a result of collision;
      2. two lead terminals fixed to said substrate means at mutually distant positions; and
      3. means for providing an electrical conductive path between said terminals, said electrical conductive path means being a conductive material fixedly disposed with respect to said substrate means and being rendered non-conductive upon breaking of said substrate means; and
   b. switching means for producing an on-off signal corresponding to conduction and non-conduction of the conductive path between said lead terminals, said switching means produces an off-signal for activating an occupant protection system of the vehicle in response to the detection of a vehicle collision.

5. A vehicle collision detecting apparatus comprising:
   first means at a part exterior of the passenger space of the vehicle mechanically coupled to the vehicle and having first and second terminals, said first means including conductive means fixedly disposed with respect to said first and second terminals for providing a normally conductive path between said first and second terminals and for establishing an open circuit between said first and second terminals in response to a vehicle collision at the exterior part of the vehicle; and